United States Patent [19]
Brotz

[11] Patent Number: 5,507,982
[45] Date of Patent: Apr. 16, 1996

[54] METHOD OF LARGE SPHERE PRODUCTION AT ZERO GRAVITY

[76] Inventor: Gregory R. Brotz, P.O. Box 1322, Sheboygan, Wis. 53081

[21] Appl. No.: 262,509

[22] Filed: Jun. 20, 1994

Related U.S. Application Data

[63] Continuation of Ser. No. 846,625, Mar. 5, 1992, Pat. No. 5,322,652, which is a continuation-in-part of Ser. No. 768,175, Sep. 30, 1991, Pat. No. 5,284,606, which is a continuation-in-part of Ser. No. 947,405, Dec. 29, 1986, abandoned, which is a continuation-in-part of Ser. No. 620,688, Jun. 14, 1984, abandoned.

[51] Int. Cl.$^6$ .................................................. B29C 44/06
[52] U.S. Cl. .......................... 264/29.1; 264/45.5; 264/51; 264/154; 264/321
[58] Field of Search .................................. 264/29.1, 45.5, 264/154, 321, 51

[56] References Cited

U.S. PATENT DOCUMENTS

| | | | |
|---|---|---|---|
| 3,640,081 | 2/1972 | Hadden | 264/28 |
| 3,975,194 | 8/1976 | Farnand et al. | 264/12 |
| 4,279,632 | 7/1981 | Frosch et al. | 264/9 |
| 4,400,191 | 8/1983 | Youngberg et al. | 264/12 |
| 4,565,571 | 1/1986 | Abbaschian | 264/10 |
| 5,073,317 | 12/1991 | Brotz | 264/321 |
| 5,284,606 | 2/1994 | Brotz | 264/40.3 |
| 5,322,652 | 6/1994 | Brotz | 264/55 |

Primary Examiner—Allan R. Kuhns
Attorney, Agent, or Firm—William Nitkin

[57] ABSTRACT

A method of creating large hollow spheres and other shapes and structures produced according to such method, such method including suspending in a zero gravity environment a molten material mixed with a blowing agent which is caused to foam, expanding into a mass wherein the exterior sphere wall is solidified and the interior is hollowed out.

6 Claims, 6 Drawing Sheets

METHOD OF LARGE SPHERE PRODUCTION AT ZERO GRAVITY

This application is a continuation of my previous application under the same title, Ser. No. 07/846,625 filed Mar. 5, 1992, now U.S. Pat. No. 5,322,652, which application was a continuation-in-part of my previous application entitled Sphere Production Process at Zero Gravity filed Sep. 30, 1991, Ser. No. 768,175 now U.S. Pat. No. 5,284,606 which was a continuation-in-part of my previous application under the same title filed Dec. 29, 1986, Ser. No. 947,405 now abandoned which was a continuation-in-part of my previous application entitled Sphere Production Process, filed Jun. 14, 1984, Ser. No. 620,688, now abandoned.

BACKGROUND OF THE INVENTION

1. Field of the Invention

This invention relates to production techniques of spheres and other shaped structures at zero gravity and more particularly relates to a method of producing strong lightweight, large, thin-walled carbon or other material spheres or other shapes for a variety of uses.

2. History of the Prior Art

The production of materials in outer space in a weightless environment including the manufacture of hollow metal spheres has been appreciated and discussed in the prior art in U.S. Pat. No. 3,534,926 to H. F. Wuenscher entitled Space Manufacturing Machine. The production of hollow spheres in a normal environment has been disclosed such as in U.S. Pat. No. 4,303,603 to Torobin. The desirability of spheres in outer space has been appreciated in U.S. Pat. No. 4,734,021 to Maddock.

SUMMARY OF THE INVENTION

It is an object of this invention in some embodiments to manufacture in a zero gravity environment, such as in outer space, very large hollow spheres and structures of other shapes which can be useful for a variety of purposes including, but not limited to, storage tanks, rooms for space stations and, made of glass, greenhouses. These spheres are strong, lightweight and can have walls of varied thicknesses. Although spheres are discussed below, it should be understood that non-spherical structures can also be produced by the method of this invention. Spheres returned to earth can be used for a variety of purposes such as spherical boat hulls suitable for oil transportation, under-ocean bathyspheres and biospheres. On land spheres or spheres cut up, such as cut in half, can be used as domes for buildings. Spheres of some materials can be used for chemical processing vessels.

In one embodiment such very large spheres can be created by the following method. A molten globule of material mixed with a blowing agent can be ejected from a spacecraft into outer space at zero gravity where the vacuum of, outer space will cause the blowing agent to generate gas and cause the material to foam significantly thereby increasing its volume. In the low temperature of outer space, especially if this operation were carried out in the shadow of a large celestial body, the outside surface of the expanding sphere would eventually cool, cease to expand and solidify. A corridor is then formed such as by hand by injecting heat from a heat gun from the exterior of the sphere into its center, and the heat gun can then be carried into the sphere's center by an individual through the corridor created into the center of the sphere. The individual then directs the heat from the heat gun against the inside of the sphere, thereby melting the inner cell walls and causing the newly molten material forming such cell walls to flow together toward the exterior wall of the sphere. As the heat from the heat gun inside the sphere approaches the outer surface of the sphere, the process of cell wall melting and the flowing together of the melted material forming the cell wall, due to the directed heat of the heat gun, does not continue because the low temperature of outer space, especially in a shadow area, keeps the exterior of the sphere at a temperature lower than its melting point. The heat of the heat gun can be regulated so as not to melt through the outer surface of the sphere. In some cases, the sphere, after formation, can be baked at high temperatures to cause graphitization of its wall. In one embodiment the spheres can be cut in half. One use for half-spheres is as a re-entry shield from outer space into earth's atmosphere. As the half-spheres heat up on re-entry, they graphitize and an ablative reaction occurs. Items can be carried within the concave portion of the half-sphere to protect them from damage during such period of high temperature.

A solar concentrator can direct and concentrate sunlight onto a revolving foamed sphere. These concentrators can be made out of metallized graphite fabric sewn onto a nitinol, or equivalent metal, framework in a shape suitable to act as a reflector. The nitinol and the fabric can be folded into a capsule for putting it into orbit. Once in orbit and exposed to the sun, the nitinol would assume its original shape to form the large reflector. The spheres could also be sent in an elliptical orbit around and closer to the hot sun for carbonization, if desired. Carbonization must occur in an oxygen-free environment and outer space is ideal as one does not need to provide an inert gas atmosphere or create a vacuum as one would have to provide on earth. These heat sources can also be used to fuse glass particles or metal onto the surface of the sphere.

One can produce series of interconnected spheres using this process during acceleration if material is projected from the first sphere and fails back on such first-formed sphere such as by an individual carrying new globules of material and blowing agent into the first sphere and ejecting it from a sector of the first-created sphere by an extruder or piston injector with the extruded materials forming a connected adjoining partial sphere. This process can be repealed to produce any number of adjoining partial or complete spheres in any desired arrangement. The aperture through which such materials can be extruded can be obliquely positioned to the initial entry aperture to create a toroid shape of multiple adjacent spheres or any other centrical or non-centrical arrangement of spheres. It should be noted that these attached sphere structures can be quite large and could be utilized as living quarters in outer space such as part of, for example, a space station. When using an external heal source, the foamed sphere can be melted from the outside to form non-spherical shapes as discussed further below. Such spheres can also be manually cut in half and coated to be used as antennas, concentrators, reflectors and re-entry shields. To make saucer shapes, the spheres can be cut at less than their largest diameter and the two portions joined. Other means of manipulating the heat guns or for cutting spheres can be used such as operated by robots or equivalent means.

These and other objects and embodiments of the invention will become clearer with reference to the following drawings and descriptions thereof.

DESCRIPTION OF THE PREFERRED EMBODIMENTS

Figure 1:
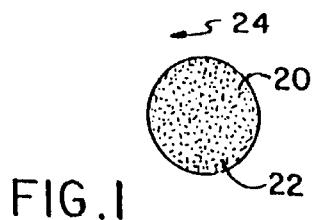
FIG. 1 illustrates a molten globule of resin mixed with blowing agents in a zero gravity condition within a vacuum.
Figure 2:
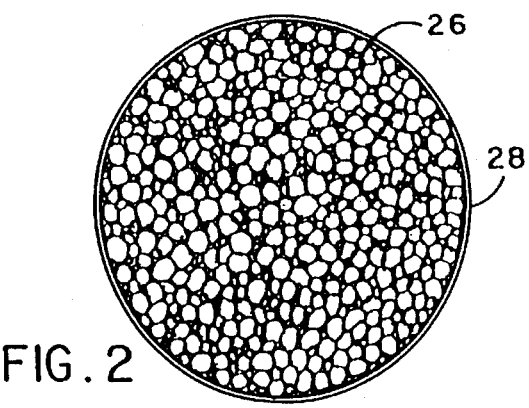
FIG. 2 illustrates the globule of FIG. 1 wherein the blowing agents have generated gas causing the resin to foam thereby increasing its volume with its outer surface cooled and solidified.
Figure 3:
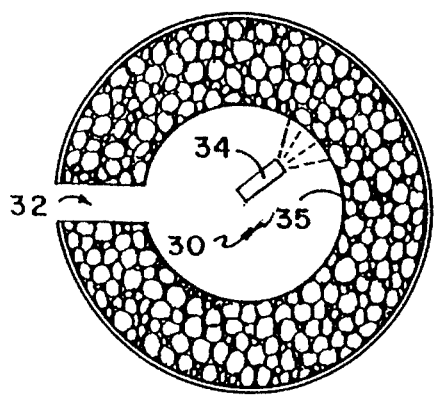
FIG. 3 illustrates the foamed resin of FIG. 2 having a corridor made into a central portion thereof with a heat gun melting the cell walls to coalesce and fuse the resin forming a hollow sphere.
Figure 4:
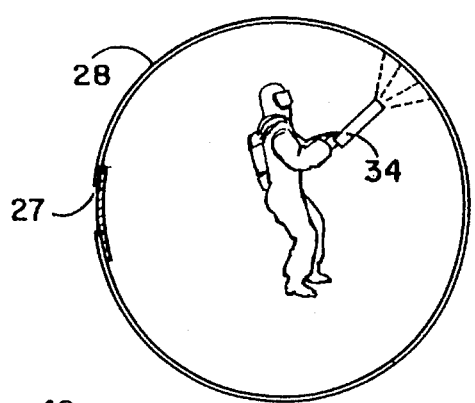
FIG. 4 illustrates the sphere of FIG. 3 with the heat gun shown approaching the outer surface of the sphere.

FIG. 1 illustrates a molten globule 20 which can be thermoset or thermoplastic resin containing a blowing agent 22 which globule is ejected into outer space 24 within a cool zero gravity area having a vacuum such as found in outer space. It should be noted that spheres produced by this process and other processes described below can be made of many materials that would yield hollow spheres or other shaped structures. As illustrated in FIG. 2, once the molten globule of material is within the vacuum of outer space, the blowing agent generates gas and forms a foam 26 substantially increasing its volume. The low temperature of outer space eventually causes the other surface 28 of the expanding or expanded sphere to solidify. A corridor 32 can be made to the inside of the sphere by an individual with a heat gun 34 which is introduced into the sphere and manipulated to direct its heat against interior 30 of the sphere which heat melts the sphere's inner cell walls causing them to break and the material 35 that was the cell's walls then retracts away from the sphere's center toward its outer surface with the molten material coalescing and fusing against the sphere's outer wall surface. When the heat gun approaches the solidified outer surface 28, as seen in FIG. 4, the melting process of the foam cannot continue because of the extremely low temperature of outer space. The heat level produced by the heat gun is regulated so as not to melt through the sphere's outer surface, the heat intensity generated by the heat source being adjusted to be insufficient to cause the necessary melting action to penetrate the outer surface and maintaining the heat radiation from the surface of the sphere at a point greater than the heat generated by the heat source. Although the local temperature of the heat source melting the cell walls may be well above the melting temperature of the material, as the heat penetrates into the outer regions of the sphere skin, the temperature of the material drops because the sphere's surface radiation is greater than the amount of heat from the heat source. Further, the scanning action used when holding the heat gun allows the portion not immediately being struck by the heat to cool as it is not struck by the heat continuously. In one embodiment to help prevent surface melt-through, the sphere can be removed from the cool area of outer space and its outer surface cured by baking which process will form a hardened outer surface which will not be affected by the heat from the heat gun. Another method to assist in preventing melt-through is to cure the outer surface of the sphere slowly such as by external heat such as from the sun or other types of curing processes suitable for the material used to make the sphere. A thermosetting resin can be utilized and because of the cross-linking properties of its molecules when it cures, such cured resin will not remelt, making it possible to later carbonize the cured sphere. During such curing of the outer skin by heat from a light source or heat from an incandescent source, either of which can be directed by large reflectors as previously described, there can be a collapsing inward of the sphere causing the diameter of the resulting sphere to be less than that of the original foam sphere just after blowing has stopped. If a very hot heat source is used, this inward collapsing can be held to a minimum. In some cases there may be some extra blowing initially upon remelting the outer surface, and the lowering of the material's viscosity due to the high temperature will cause the cell walls to collapse and form a non-porous skin before the thermosetting or curing of the surface is totally completed. During this process the vacuum of outer space will also help to degas the coalescing outer cell walls. If novolac phenolic resins are used, they need a curing agent to thermoset. There are novoleos, thought which do gel and thermoset over long periods of heating, or shorter periods at higher temperature healing and this type of material is well-suited for sphere manufacture. It should be noted that if a thermosetting resin is used, its melting temperature usually increases with its heat history. In some embodiments the exterior of the foamed sphere can be first cured before the hollowing out process is begun. The center of the sphere will be the last to cool, its heat having the longest distance to travel to the sphere's surface. Therefore when making spheres of thermosetting resins, the melting temperature of the center can be higher than that of the surface. Also a blend of novolac and resole phenolic resins can be used that has a very long heat history before it reaches a cured state. The ratios of novolac to resole can be from 70% novolac—30% resole to 70% resole—30% novolac. One blowing agent which could be used therewith is ethyl alcohol which is soluble in the resin and volatilizes easily upon reduction of pressure. Blowing agents are known in the foaming industry under many brand names.

Figure 12:
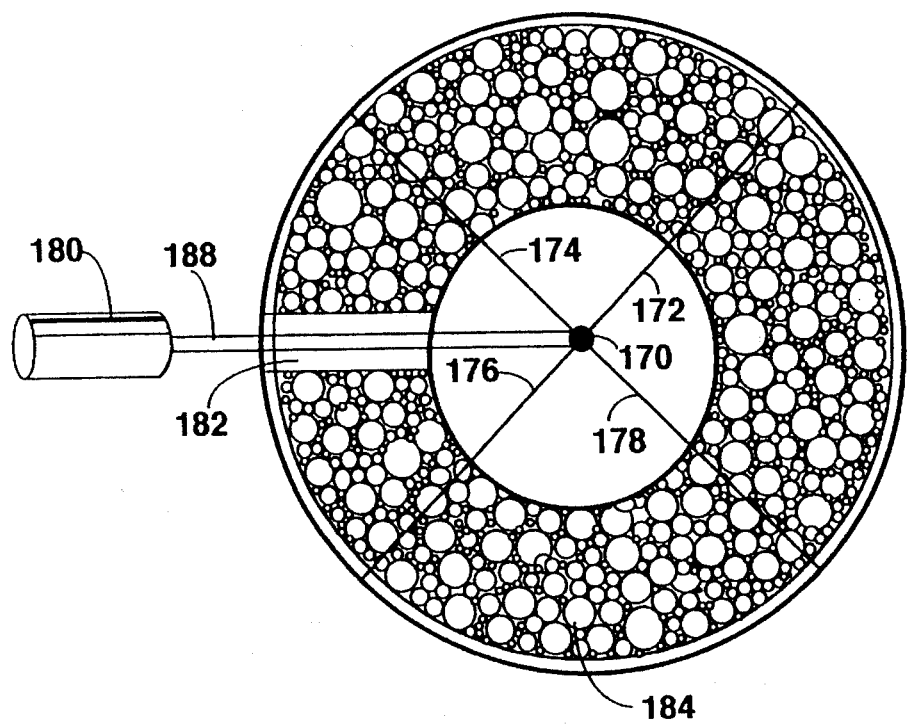
FIG. 12 illustrates a foamed material sphere with a central heated mass to melt the cell walls to coalesce and fuse the cell wall material to form a hollow sphere.

Another method of breaking the cell walls 184 of the foamed structure, as illustrated in FIG. 12, is to embed a mass 170 in the center of the structures held, for example, by four rigid wires 172, 174, 176 and 178 extending in a plane at 90 degrees from each other to the outer wall and to generate heat at the central mass to cause the desired cell breakage. The central mass can be electrically heated or be the location and holder of a chemical reaction producing heat. If the central mass is metallic, it can also be heated by a heat beam 188 such as from laser 180 aimed through a corridor 182 made in the foam mass to cause the metallic central mass 170 to irradiate heat to break cell walls 184 therearound.

Figure 5:
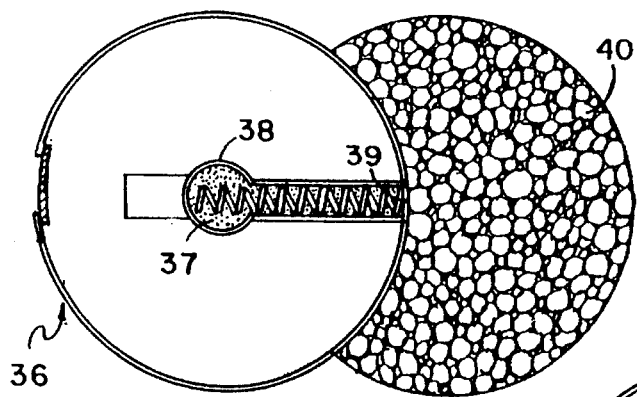
FIG. 5 illustrates the extrusion of material foamed to form an adjacent partial sphere to the first sphere.
Figure 6:
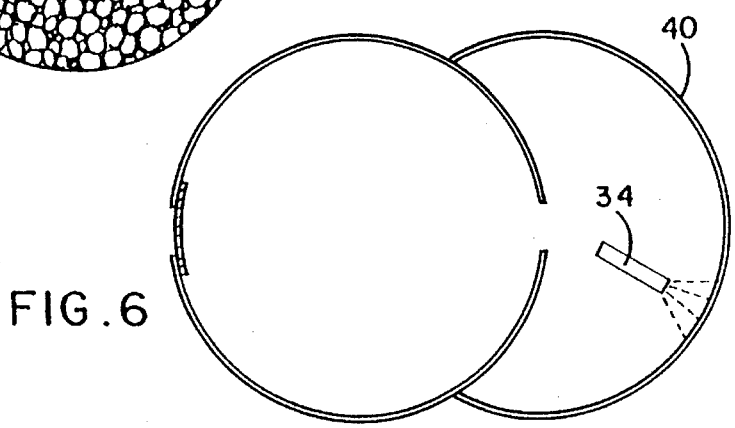
FIG. 6 illustrates a view of such adjacent sphere attached to the first sphere being hollowed out by the action of the heat gun.
Figure 15:
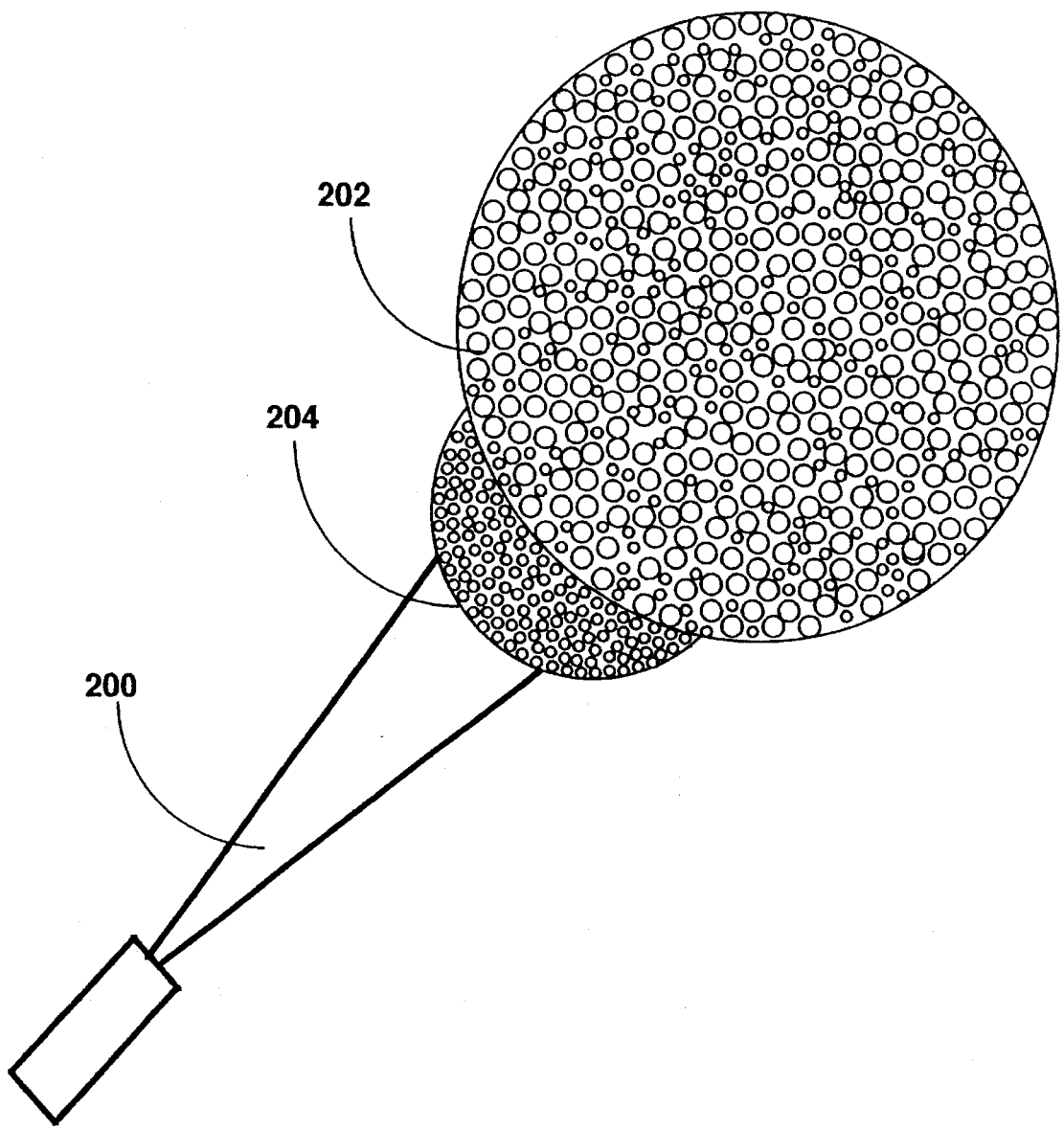
FIG. 15 illustrates the direction of heat against a sphere to create a desired shape.

In FIG. 5 a process for producing multiple adjoining spheres and partial spheres is illustrated. First sphere 36 is formed as described above having a projector 38 maneuvered therein which acts to extrude a globule of molten resin with a blowing agent through hole 39 formed in the exterior of first sphere 36 where the resin foams and expands to form a second partial sphere 40 which is attached to and joins first sphere 36. Second partial sphere 40, as seen in FIG. 6, is hollowed out by use of heat gun 34 in a similar fashion as utilized in producing the first sphere. Additional spheres and partial spheres can be added in a variety of arrangements by repeating the above-described process. The multi-sphere structure so created can be useful for a variety of purposes both in outer space and on earth. In some embodiments to promote the expansion of the resin globules, heat can be applied to cause the blowing agent(s) to be more active during the initial process of the foam formation and expansion. Such heat can be obtained from solar reflectors, incandescent heaters or microwave transmitters directing heat or light beams. If such a heat beam 200, as seen in FIG. 15, is provided in a first area 202 longer than at another, the foaming action occurs for a longer period of time in that first area, making that a now-larger area 204, and many shapes such as cylinders can be formed.

The weight of the material utilized, such as resin, needed for a particular large sphere size, such as a sphere having a 4-ft diameter or larger diameter, and wall thickness is listed in the chart below utilizing a specific gravity of 1.2 for uncarbonized phenolic resin.

| Diameter | Wall Thickness | Weight |
| --- | --- | --- |
| For 4-ft Spheres: | .25 in. | 77.6 lb. |
| | .50 in. | 153.6 lb. |
| | 1.00 in. | 300.0 lb. |
| | 2.00 in. | 576.7 lb. |
| | 4.00 in. | 1,057.5 lb. |
| For 10-ft Spheres: | .25 in. | 488.2 lb. |
| | .50 in. | 972.4 lb. |
| | 1.00 in. | 1,928.5 lb. |
| | 2.00 in. | 3,792.7 lb. |
| | 4.00 in. | 7,332.7 lb. |
| For 20-ft Spheres: | .25 in. | 1,956.9 lb. |
| | .50 in. | 3,905.7 lb. |
| | 1.00 in. | 7,778.9 lb. |
| | 2.00 in. | 15,428.1 lb. |
| | 4.00 in. | 30,342.0 lb. |
| For 40-ft Spheres: | .25 in. | 7,835.9 lb. |
| | .50 in. | 15,655.5 lb. |
| | 1.00 in. | 31,245.7 lb. |
| | 2.00 in. | 62,231.1 lb. |
| | 4.00 in. | 123,425.0 lb. |
| For 50-ft Spheres: | .25 in. | 12,246.1 lb. |
| | .50 in. | 24,471.9 lb. |
| | 1.00 in. | 48,862.2 lb. |
| | 2.00 in. | 97,398.7 lb. |
| | 4.00 in. | 193,498.7 lb. |

Figure 7:
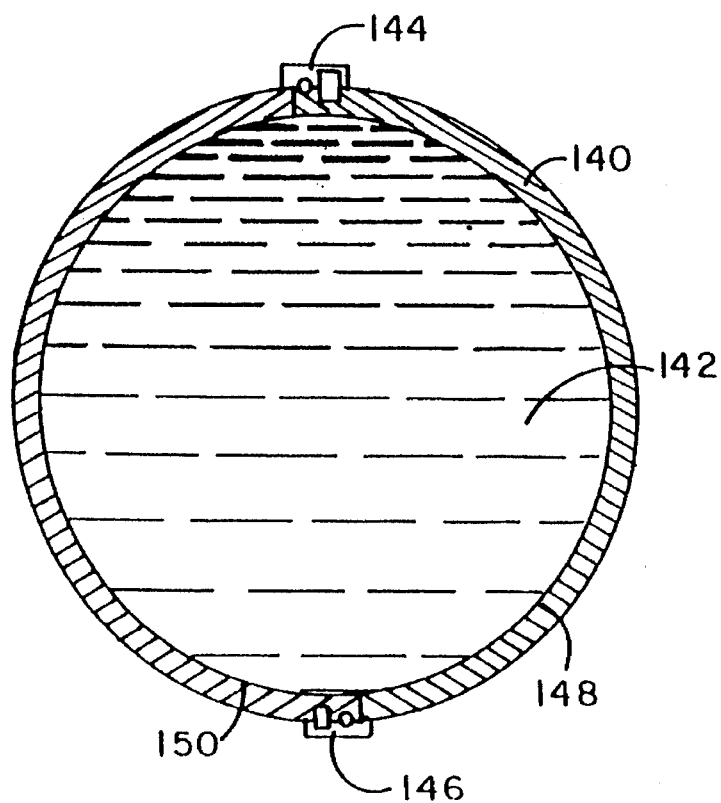
FIG. 7 is a cross-sectional view of a shell carrying molten resin for disposition in outer space.
Figure 8:
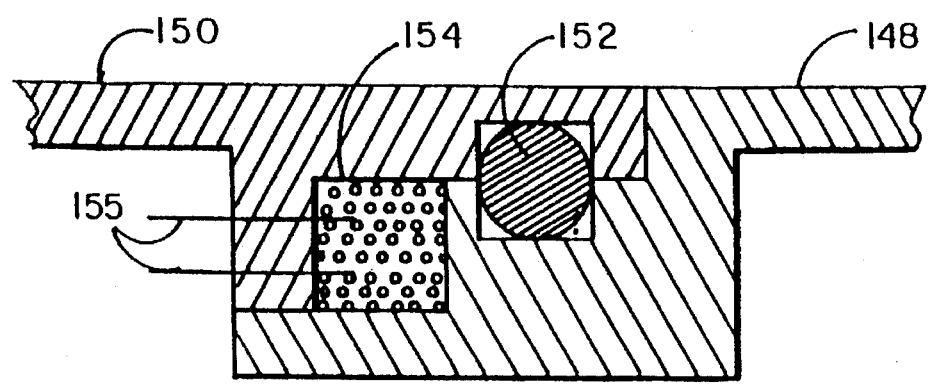
FIG. 8 is a closeup view of the separation mechanism for the shell halves as seen in FIG. 7.
Figure 9:
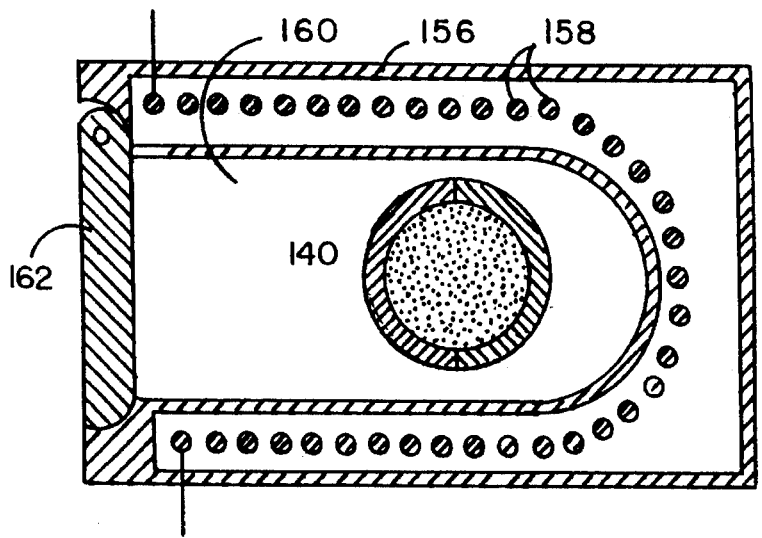
FIG. 9 is a cross-sectional view through a chamber on a spacecraft with exit means.
Figure 10:
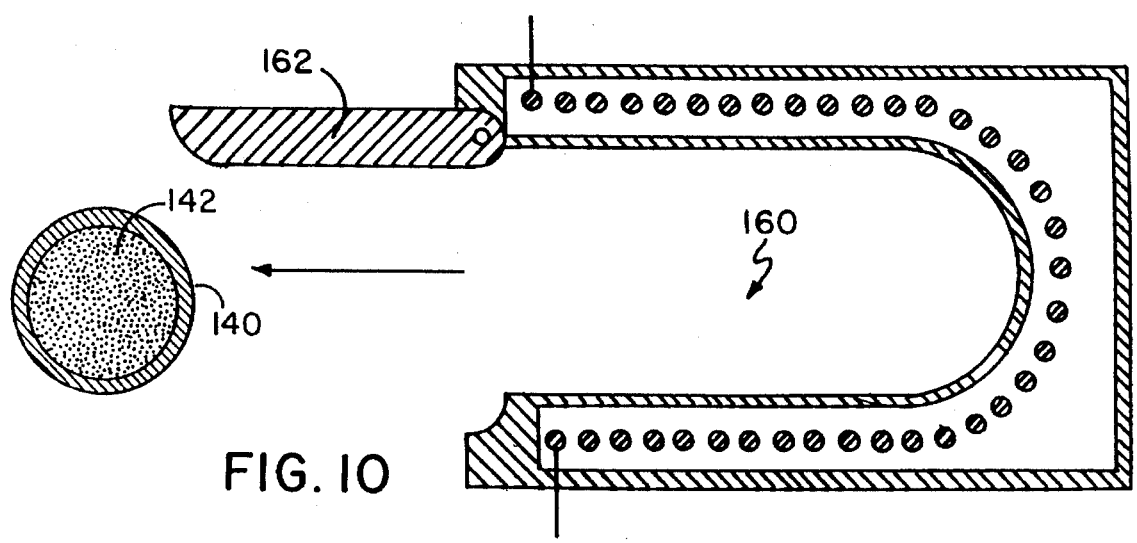
FIG. 10 illustrates the chamber of FIG. 9 with the exit means open and the sphere escaping therefrom.
Figure 11:
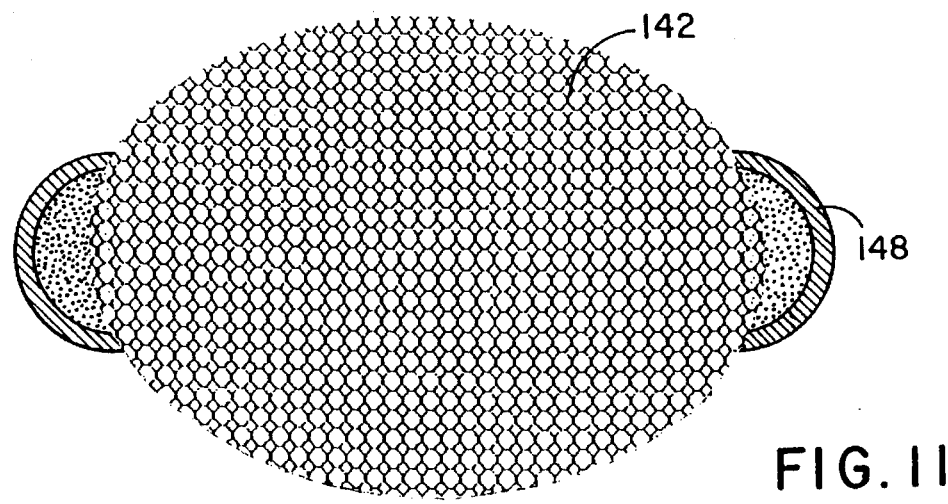
FIG. 11 illustrates the sphere of FIG. 8 having opened with the molten resin escaping therefrom.

Several methods of ejecting molten resin into outer space for use in the formation of spheres and other structures of this invention can be utilized. One such embodiment is illustrated in FIGS. 7–11. In FIG. 7 shell 140 can be formed of half spherical shells 150 and 148 which are joined together around a central seam and have contained therein molten resin and blowing agent 142. Confinement shell 140 can be held together at release junctions 144 and 146 which can allow for the release of the two shell halves 148 and 150 when the molten resin is to be released in outer space away from the spacecraft carrying the molten resin. The release mechanism in the junctions can be two separate areas or be formed as part of a continuous joint around the confinement shell. Release junctions 144 and 146 can be of the type as illustrated in FIG. 8 wherein shell halves 148 and 150 have portions which overlap one another and have a rubber gasket 152 for sealing and an explosive charge 154 with detonation electrical leads 155 extending to the spacecraft. The gasket can be sheared or deformed out of the way when the confinement shell is opened. When the sphere is carried in the spacecraft, it can be held within a chamber 160, such as seen in FIG. 9, surrounded by heating coils 158 within housing 156 to separate the chamber from the rest of the spacecraft. In some embodiments a heating element can be provided on the confinement shell itself so that there is no need for a separate heating chamber. Door 162 can be provided to the outside the spacecraft. As illustrated in FIG. 10, when door 162 is opened, confinement shell 140 is allowed to escape from chamber 160 to outer space where an electric charge through the detonation leads which extend to the ship can explode explosive charges 154, thereby blowing the shell apart at the release junctions which hold it together and causing the halves of shell 148 and 150 to separate as seen in FIG. 11, releasing molten resin and blowing agent 142 to be processed as described in this invention. The explosive charge can also be detonated by radio-controlled devices.

Figure 13:
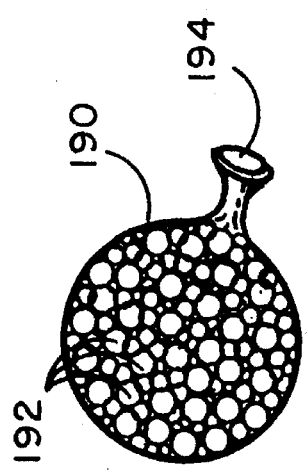
FIG. 13 illustrates a balloon filled with resin mixed with a blowing agent at zero gravity.
Figure 14:
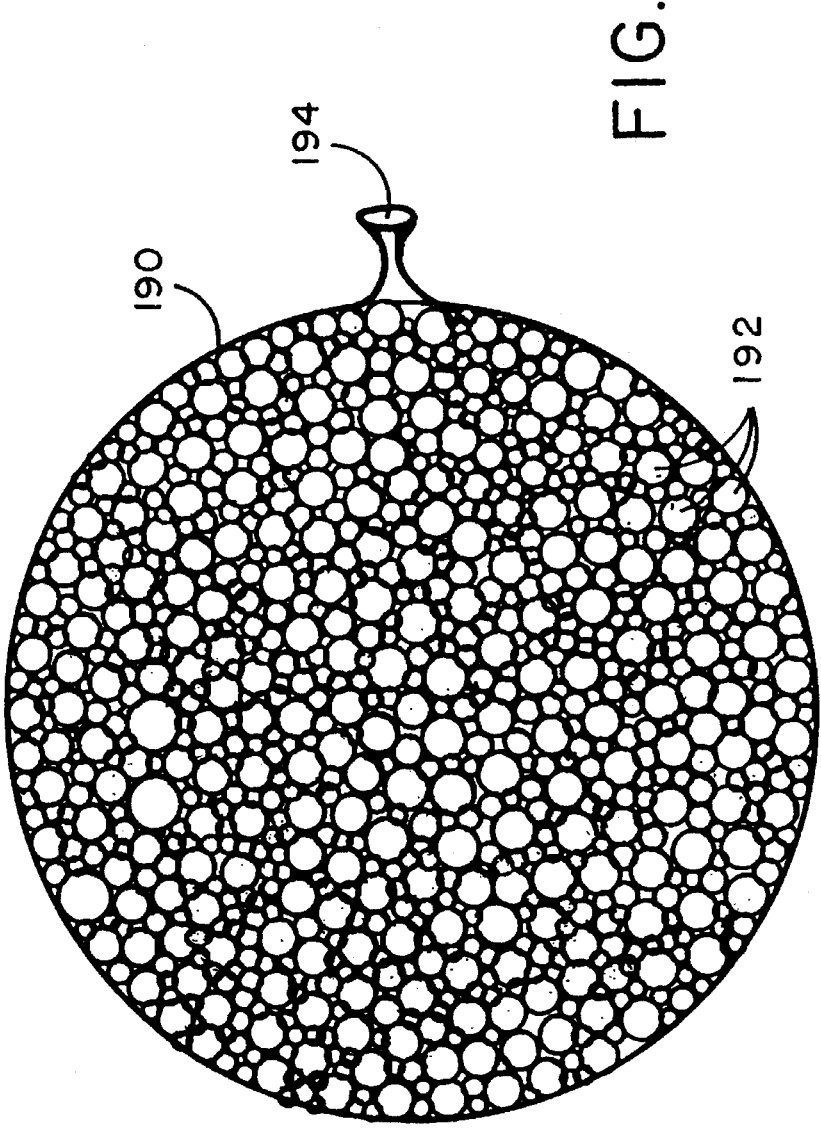
FIG. 14 illustrates the balloon of FIG. 13 wherein the blowing agent has generated gas causing the resin to foam thereby increasing its size and expanding the balloon.

Another method of transporting resin into outer space is to place molten resin 192 mixed with its blowing agent into balloon 190 through opening 194 as seen in FIG. 13. Balloon 190 can be made of a stretchable silicon rubber and can be stretched to be of a large size as the blowing agent activates, expanding the resin into a foam as seen in FIG. 14. As the foaming resin expands in balloon 190, it meets less and less resistance from the balloon which exerts more pressure when unexpanded and such pressure is reduced as the balloon expands. The balloon's shell will in no way hinder or prevent the solidification of the outer surface of the sphere.

After the exterior surface of a foamed sphere has hardened with the interior cell walls still being molten, an aperture can be cut in the sphere and a tube inserted therein which tube can be sealed in place and through which tube can be injected pressurized air into the sphere's interior which pressure will also cause breakage of the interior cell walls.

In some instances where a sphere has a solidified exterior surface while still having an interior of cells having molten walls, if such sphere is returned from outer space to the earth's environment, the solidified exterior can be of a thickness to prevent the sphere's collapse in the higher pressure environment of the earth's surface. One can then provide a tube, for example by drilling a hole and inserting such tube in through the solidified sphere wall to the interior. This tube will allow the exterior atmosphere's higher pressure to enter the sphere and cause the collapse of the interior cell walls because the interior cell walls are still of molten material which is fluid and the cells contain pressure from the blowing agent which is much less than the entering atmospheric pressure.

Although the present invention has been described with reference to particular embodiments, it will be apparent to those skilled in the art that variations and modifications can be substituted therefor without departing from the principles and spirit of the invention.

I claim:

1. A method to create a hollow structure comprising the steps of:

mixing a blowing agent with molten material;

suspending said mixture in a zero gravity environment;

foaming said material to form a cellular mass having cell walls by action of the blowing agent with said molten material, said cellular mass having an exterior outside surface and an interior of inner cells;

expanding the volume of said molten material by said foaming;

forming a shape of said molten foamed material cellular mass;

cooling the outside surface of said structure, said interior inner cells remaining molten;

solidifying said outside surface by said cooling;

accessing said interior inner cells;

breaking the interior inner cell walls of said foamed material structure;

forming a hollow interior in said structure by said breaking of said inner cell walls, allowing the broken cell wall material to coalesce on the inside of the solidified outer surface of said structure;

cooling said coalesced cell wall material; and forming a structure wall having a solid inside surface within said solid outside surface by said cooling of said remaining molten material.

2. The method of claim 1 wherein the steps of accessing said interior inner cells, breaking said interior cell walls and forming a hollow interior in said structure include the steps of:

tunneling into the interior of said cellular mass;

heating said molten foamed material of said inner cells;

breaking said inner cell walls of said foamed material by said heat; and coalescing and fusing said material of said broken cell walls outward toward said structure's outside surface.

3. The method of claim 2 further including the step of:

regulating the level of said heat applied to said inner cell walls inside said structure so as not to melt through said solid outside surface of said structure.

4. The method of claim 2 further including the step of:

carbonizing said structure by baking said structure at high temperatures.

5. The method of claim 2 further including the step of:

curing the material of said structure's outer surface.

6. The method of claim 5 further including the step of:

carbonizing said structure by baking said structure at high temperatures.

* * * * *